Sept. 9, 1969  A. G. BERT  3,466,576
IMPEDANCE MATCHED PERIODIC SLOW WAVE STRUCTURE
Filed Jan. 25, 1967  4 Sheets-Sheet 1

Inventor
Alain G. Bert
By Wm Nolan
Attorney

Inventor
Alain G. Bert
By Wm J. Nolan
Attorney

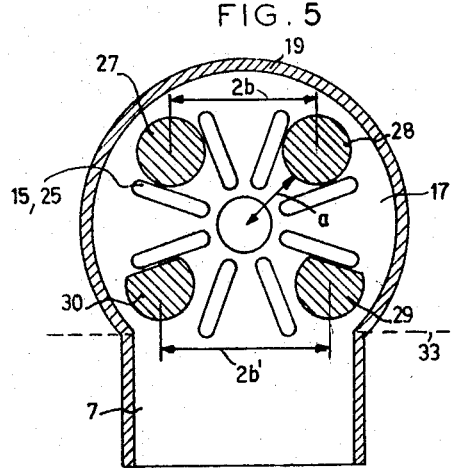
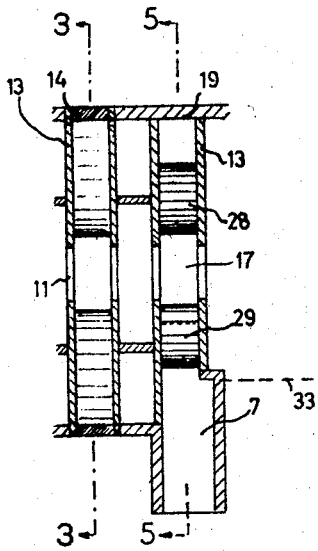
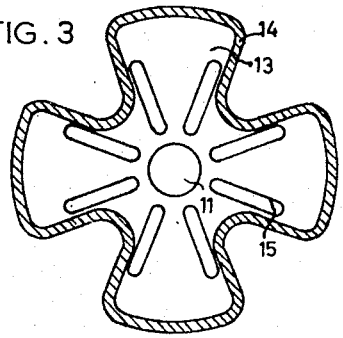
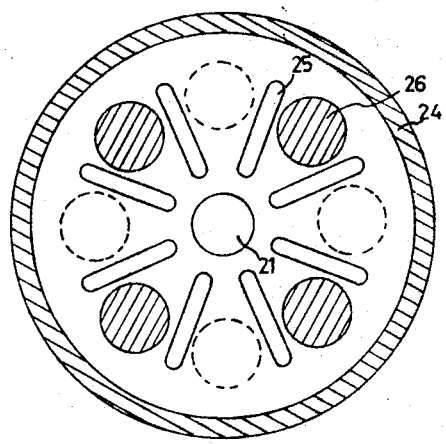
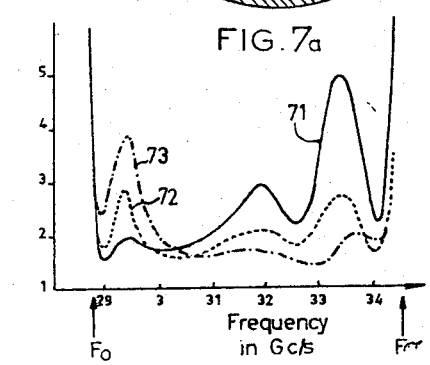
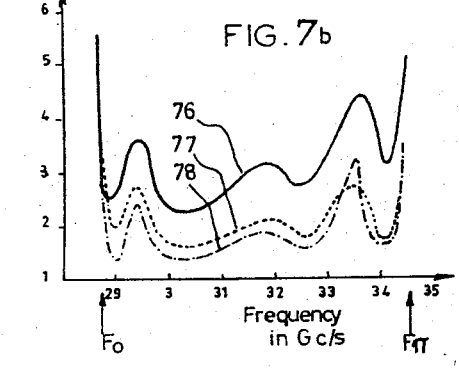

Sept. 9, 1969  A. G. BERT  3,466,576

IMPEDANCE MATCHED PERIODIC SLOW WAVE STRUCTURE

Filed Jan. 25, 1967  4 Sheets-Sheet 4

Inventor
Alain G. Bert
By W. J. Nolan
Attorney

United States Patent Office 3,466,576
Patented Sept. 9, 1969

3,466,576
IMPEDANCE MATCHED PERIODIC SLOW
WAVE STRUCTURE
Alain G. Bert, Gif-sur-Yvette, France, assignor to Thomson-Varian, Paris, France, a company of France
Filed Jan. 25, 1967, Ser. No. 611,730
Claims priority, application France, Jan. 26, 1966, 47,329
Int. Cl. H03h 7/30, 7/38
U.S. Cl. 333—31                                           4 Claims

ABSTRACT OF THE DISCLOSURE

Slow-wave structure of the partitioned waveguide type, comprising cavity-resonators aligned along a longitudinal axis and separated by partitions, central capacitive coupling holes and radial negative inductive coupling slots through said partitions, including a terminal cavity-resonator coupled to an output waveguide, said terminal cavity-resonator comprising two normal post members and two special post members perpendicular to the partitions of said terminal cavity-resonator, said post members being located in alternate sectors delimited by the radial slots, the diameter and mutual distance of the two normal post members being respectively smaller than the diameter and the mutual distance of the two special posts and the line joining the centers of the two special posts being parallel to the transverse section of the output waveguide.

---

The invention relates to improved impedance matched periodic microwave circuits of the slow-wave type.

Numerous types of slow-wave structures are known in the art which can be used in travel-wave tube amplifiers, backward wave oscillators, linear accelerators, microwave filters and velocity modulating tube amplifiers. The coupling of the structure to the input and output waveguide can be either capacitive, or inductive, by means of irises, rods or antennas, or loops. But it is relatively difficult to obtain optimum matching at the input or output of a slow-wave structure. Thus, in the case for example of a "clover-leaf" structure, it is necessary to decrease progressively the length of the terminal clover-leaf cavity-resonators and then find by trial and error the position to be given to a cental tubular stub projecing into the last cavity-resonator so as to obtain the required matching.

The invention concerns slow-wave structures of the partitioned waveguide type wherein successive partitions form cavity-resonators in the waveguide and are each pierced both by a central hole for the passage of the beam and capacitive coupling between cavity-resonators and radial slots providing negative inductive coupling between cavity-resonators, arranged uniformly about the geometrical axis of the structure and, more particularly, slow-wave structures of one of the types called "four leaved clover" and "tetrastyle" structures, the latter being described in my copending patent application Ser. No. 610,685 filed Jan. 20, 1967 and assigned to the same assignee as the present invention. It will merely be recalled here that the latter slow-wave structure is derived from the "clover-leaf" structure by replacing the outer projections of each clover-leaf by a circumscribed cylinder and the re-entrant parts of the clover-leaf by four osculating "posts" fixed between adjacent partitions in each cavity, said posts being alternately offset by an angle equal to the angle between two adjacent radial slots from one cavity-resonator to the next.

The main object of the invention is to provide, in periodic slow-wave structures of the type which has been just reminded and more generally of the partitioned waveguide type with central capacitive holes and radial slots providing negative inductive coupling, a cavity-resonator used as input or output cavity-resonator which matches the periodic slow-wave structure to an input and output waveguide.

An additional object of the invention is to provide such a terminal cavity-resonator which further permits effective cooling of the terminal part of the structure by means of cooling fluid.

According to the invention a slow-wave structure of the partitioned waveguide type, comprising cavity-resonators aligned along a longitudinal axis and separated by partitions, central capacitive coupling holes and radial negative inductive coupling slots through said partitions, includes at least a terminal cavity-resonator coupled to an input or output waveguide, said terminal cavity-resonator comprising two cylindrical posts (hereinafter called normal posts) and two flattened cylindrical posts (hereinafter called special posts) perpendicular to and contacting the partitions of said terminal cavity-resonator, said posts being located in alternate sectors, delimited by the radial slots, the diameter and mutual distance of the two normal posts being respectively smaller than the diameter and the mutual distance of the two special posts and the line joining the centers of the two special posts being parallel to the transverse section of said output waveguide.

The four posts of said terminal cavity-resonator may advantageously be extended beyond the wall closing the same to penetrate inside a casing forming an integral part of the cooling circuit of the slow-wave structure.

This and other objects, characteristics and advantages, will be apparent from the following detailed description of two forms of construction given by way of non-limiting examples with reference to the accompanying drawings in which:

FIG. 3 is a transverse sectional view of a prior art conventional cavity-resonator in FIG. 1, this section being taken along the line 3—3 in FIG. 1;

FIG. 4 is a transverse sectional view of a prior art conventional cavity-resonator in FIG. 2, this section being taken along the line 4—4 in FIG. 2;

FIG. 5 is a transverse sectional view of a terminal cavity-resonator according to the invention, this section being taken along the line 5—5 in FIG. 6, in the direction of the arrows;

FIG. 6 is a longitudinal view of a set comprising two conventional cavity resonators of the slow-wave structure of FIG. 1 and a terminal cavity-resonator according to the invention;

FIGS. 7a and 7b represent the variations in the voltage standing-wave ratio versus frequency permitted by the terminal cavity-resonator according to the invention;

Figure 9:
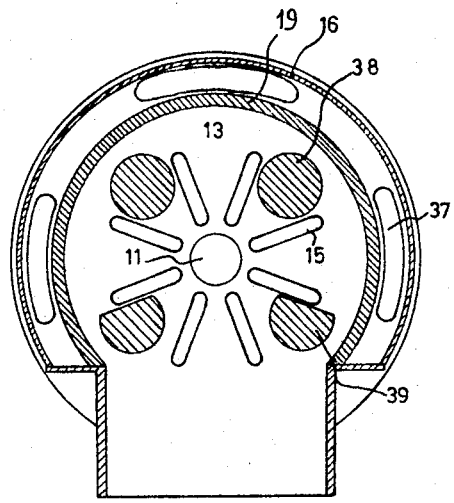
Figure 8:
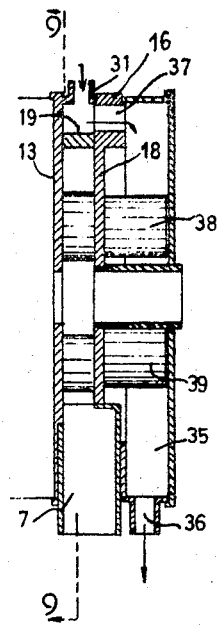
FIG. 8 is a longitudinal sectional view of the terminal cavity-resonator according to the invention associated with a casing permitting cooling of the posts.
Figure 10:
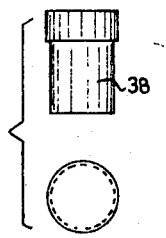
Figure 11:
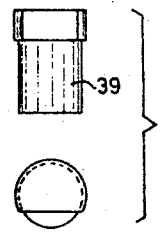

FIG. 9 is a transverse sectional view of the terminal cavity-resonator of FIG. 8 along the line 9—9 in this figure; and FIGS. 10 and 11 are diagrammatic views from above and from the side of the posts used in the device of FIGS. 8 and 9.

Figure 1:
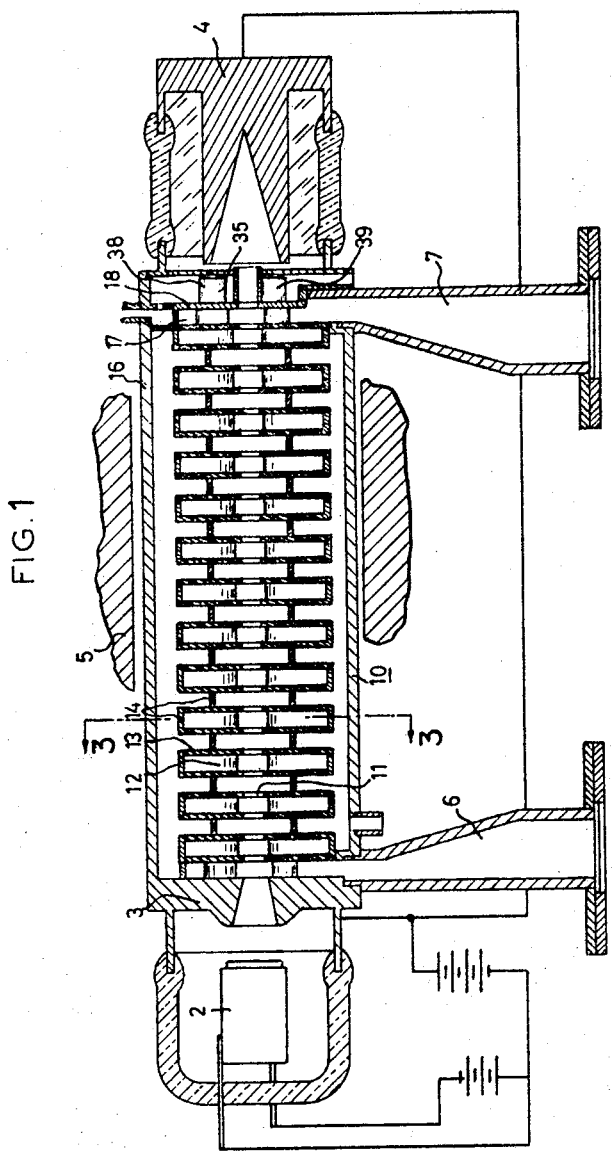
FIG. 1 is a longitudinal sectional view of a traveling-wave tube, equipped with a slow-wave structure of the clover-leaf type, this slow-wave structure belonging to the prior art except for its two terminal cavity-resonators which employ the feature of the present invention.
Figure 2:
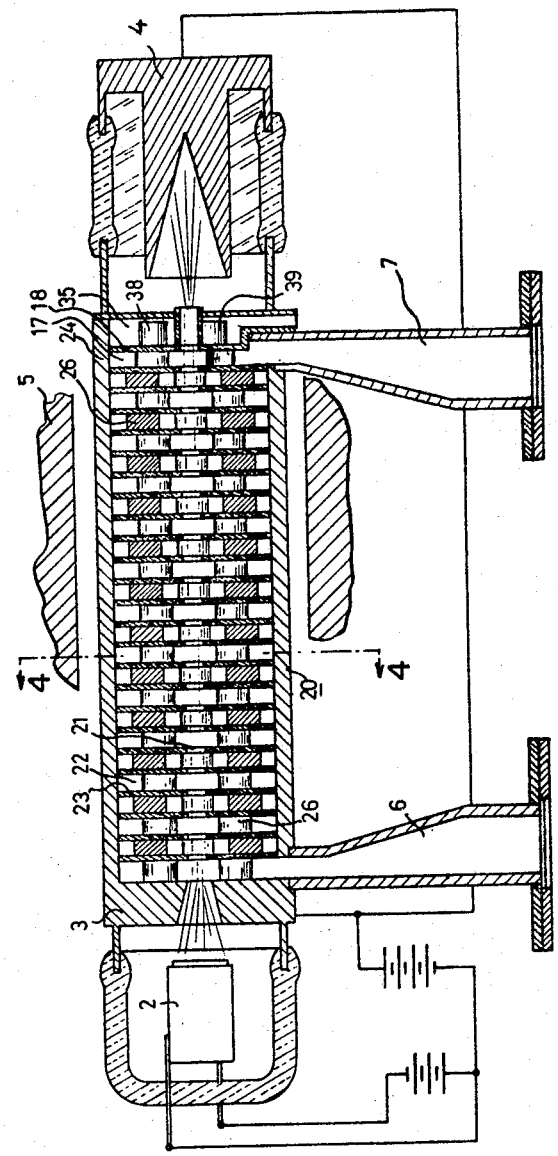
FIG. 2 is a longitudinal sectional view of a traveling wave tube, equipped with a slow-wave structure of the tetrastyle type, this slow-wave structure belonging to the prior art except for its two terminal cavity-resonators which employ the feature of the present invention.

In FIGS. 1 and 2, the same reference numerals designate similar parts and members.

Referring to FIGS. 1 and 2 there is shown two traveling wave tube amplifiers utilizing a periodically partitioned waveguide slow wave structure respectively 10 and 20 loaded with disks respectively 11 and 21. A cathode assembly 2 provides a beam of electrons which is passed axially through a series of central capacitively coupling apertures 11 or 21 in the slow wave structures 10 and 20. An anode assembly 3 is brought to a positive potential with respect to the cathode assembly to accelerate and project the beam along the geometrical axis of the slow-wave structure. A collector assembly 4 is provided at the terminating end of the slow wave structure and serves to collect the electrons of the beam and dissipate the power therein. A focusing electrical coil 5 surrounds the slow wave structure 1 providing a magnetic field to focus and confine the electron beam, thereby minimizing beam interception within the slow wave structure. An input waveguide section 6 transmits an electromagnetic wave signal to the slow wave structure 10 or 20. The signal wave is propagated along the slow wave structure 10 wherein energy is delivered to the signal wave from the electron beam thereby increasing the amplitude of the signal wave. An output waveguide section 7 receives the amplified signal and propagates it to a load (not shown). The mean direction of the radio-frequency power flow on the slow wave circuit defines the direction of circuit development. In the case of a linear tube as shown in FIG. 1 the power flow in the slow wave circuit is coincident with the longitudinal geometrical axis of the tube.

The cavity-resonators of the slow-structure 10 are conventional except the first and the last cavity-resonators. These conventional cavity-resonators are four leaved clover cavity-resonators 12 comprising two transverse walls 13 and a longitudinal wall 14 folded in the shape of a clover-leaf (see FIG. 3). The walls 13 are pierced by radial slots 15 which are eight in number and are spaced 45° apart from one another. The successive cavity-resonators 12 are offset alternately from a cavity-resonator to the next by rotation through an angle of 45° about the longitudinal axis of the slow-wave structure. All the cavity-resonators are welded to one another and are contained in a cylindrical casing 16. Since this delay structure is known, it does not call for further comment.

The cavity-resonators of the slow-wave structure 20 are conventional except the first and the last cavity-resonators. These conventional cavity-resonators are cylindrical cavity-resonators 22 comprising two transverse walls 23 and a cylindrical outer wall 24. The walls 23 are provided with radial slots 25 (FIG. 4) which are eight in number and are spaced 45° apart from one another. Four members 26 in the form of substantially cylindrical posts are disposed in each cavity-resonator perpendicularly to the transverse walls 23 at equal distance from the cavity-resonator axis and in alternate sectors defined by the radial slots 25. All the radial slots are aligned along the structure and the sectors of a given radial direction alternately contain and do not contain a post member.

The slow-wave structures 10 or 20 are terminated by a circular cavity-resonator 17 according to the invention with internal post members 27–30 (FIGS. 5 and 6); this cavity-resonator is closed at the collector side by a wall 18 without inductive coupling slots. This wall is cut along a plane 33 parallel to the geometrical axis of the structure and the line of the centers of the most members 29–30 in order for this cavity-resonator to be extended by a waveguide 7. When cavity-resonator 17 is the terminal cavity-resonator of slow-wave circuit 10 (case of FIG. 6), the two posts 27–28 of cavity resonator 17, situated at the opposite side of this waveguide, have the dimensions and positions of two of the reentrant portions of the next to the last clover-leaf cavity. When cavity-resonator 17 is the terminal cavity-resonator of slow-wave circuit 20, the two posts 27 and 28 are angularly spaced apart by 45° from the corresponding posts in the last tetrastyle cavity-resonator. But the two post members 29–30 situated at the waveguide 7 side have dimensions, positions and even shapes adapted for affording the required impedance matching. In the examples selected, they are right cylindrical posts which have been cut to conform with the nearest inductive coupling slots. It will be noted that the width of waveguide 7 (see FIGS. 1 and 2) is not critical and may, for example, be equal to or even less than the length of the terminal cavity-resonator.

Example

The slow-wave structure is, as regards its main part, of the "clover-leaf" type and has the following characteristics:

| | Mm. |
|---|---|
| Maximum internal diameter of the clover-leaf | 115 |
| Minimum internal diameter of the clover-leaf | 54.8 |
| Radius of the re-entrant portions of the clover leaf | 10.8 |
| Radius of the rounded connection portions | 9.5 |
| Diameter of the central hole | 17.3 |
| Length of the eight inductive coupling slots | 33.4 |
| Width of the eight inductive coupling slots | 7.1 |
| Distance of the inner edge of the inductive coupling slots from the geometrical axis of the structure | 11.65 |
| Length in the axial direction of each cavity-resonator | 13.4 |
| Thickness of the partitions | 3.1 |

The last element of the slow-wave structure is of the "tetrastyle" type and this element and the output waveguide have the following characteristics:

| | Mm. |
|---|---|
| Height of the posts | 13.4 |
| Diameter of the normal posts at the side remote from the output waveguide | 21.6 |
| Distance $a$ of the inner edge of the normal and special posts from the geometrical axis of the guide | 27.4 |
| Diameter of the special posts at the output waveguide side | 23.6 |
| Distance $2b$ between the axes of the normal posts | 58.8 |
| Distance $2b'$ between the axes of the special posts | 65.4 |
| Distance of the centers of these special posts from the terminal transverse plane 33 of the waveguide | 23.6 |
| Width of the output waveguide of the type known as "WR 340" in the direction parallel to the geometrical axis of the structure | 19.7 |

It results from the above example, that the posts 27–30 are at the same distance $a$ from the geometrical axis but that the distance $2b$ between the normal posts (58.8 mms.) is smaller than the distance $2b'$ between the special posts (65.4 mms.). Further the diameter of the normal posts (21.6 mms.) is smaller than the diameter of the special posts (23.6 mms.).

FIG. 7a represents the VSWR in the terminal cavity-resonator versus frequency for different values of $a$ (distance from the inner edge of the posts to the geometrical axis) and FIG. 7b represents the VSWR for different values of $2b'$ (distance between the axes of the special posts), between the cut-off frequency of the "zero" mode and of the "$\pi$" mode.

Curve 71 corresponds to $2b'=65.4$ mms. and $a=29$ mms.

Curve 72 corresponds to $2b'=65.4$ mms. and $a=27.4$ mms.

Curve 73 corresponds to $2b'=65.4$ mms. and $a=25.8$ mms.

Curve 76 corresponds to $a=27.4$ mms. and $2b=61.4$ mms.

Curve 77 corresponds to $a=27.4$ mms. and $2b=65.4$ mms.

Curve 78 corresponds to $a=27.4$ mms. and $2b=69.4$ mms.

The better curves are 72 and 77. The diameter of the special posts exceeds by about 8 to 15% the diameter of the normal posts and the spacing between the axes of the special posts exceeds by about 8 to 15% the spacing between the axes of the normal posts.

The cooling of the terminal cavity-resonator 17 may be afforded as indicated by FIGS. 8–11. The posts 27–30 are replaced by two normal posts 38 and two special posts 39. The shape of these posts is illustrated in FIGS. 10 and 11; they have a shank the diameter of which is slightly less than that of their head. The posts pass through the wall 18 separating cavity-resonator 17 from a cooling chamber 35 adjacent said cavity-resonator. The heads of the posts are in cavity-resonator 17 and the shanks are in chamber 35. The chamber 35 is fed with a cooling fluid which is introduced through the inlet aperture 31 in the annular chamber comprised between the lateral wall 19 of cavity-resonator 17 and the circular casing 16, enters the cooling chamber 35 through apertures 37 and leaves it through the aperture 36.

When the position of a special post projects beyond the nearest inductive coupling slot, the post is cut to conform with the edge of the slot.

Since many changes could be made in the above construction and many apparently widely different embodiments of this invention can be made without departing from the scope thereof, it is intended that all matter contained in the above description or shown in the accompanying drawings shall be interpreted as illustrative and not in a limiting sense.

What I claim is:

1. In a periodic slow-wave circuit formed by an array of periodic cavity-resonators aligned together along a longitudinal axis, defined by a lateral wall and by partitions separating them from one another, coupled together by central capacitive holes and eight radial negative inductive slots, said radial slots defining sectoral portions in said cavity-resonators, at least one terminal cavity-resonator, coupled to a waveguide, forming an impedance matching transition section between said slow-wave circuit and said waveguide and comprising two substantially cylindrical normal inductive post members and two flattened cylindrical special inductive post members whose cross-section is formed by a circle and a chord thereof, said normal and special post members being inserted in said terminal cavity-resonator, disposed parallel to said axis in alternate sectoral portions remote from the cavity-resonator wall and contacting the cavity-resonator partitions, the first and second planes passing respectively through the axes of the two normal inductive post members and through the axes of the two special inductive post members being parallel to the plane of the mouth of the waveguide within said terminal cavity-resonator, said second plane being nearer to said mouth plane than said first plane, and the chord of the cross-section of the special inductive post members coinciding with the edge of a radial slot.

2. A terminal cavity-resonator as set forth in claim 1 in which the distance between the axes of the two normal inductive post members is lower by about 8 to 15 percent than the distance between the axes of the two special inductive post members.

3. A terminal cavity-resonator as set forth in claim 1 in which the diameter of the normal inductive post members is smaller than the diameter of the special inductive post members.

4. A terminal cavity-resonator as set forth in claim 1 in which a cooling chamber is provided adjacent to said terminal cavity-resonator and separated therefrom by a vacuum tight partition and both said normal and said special inductive post members extend in said cooling chamber through vacuum tight passages provided through said partition.

References Cited

UNITED STATES PATENTS

| | | | |
|---|---|---|---|
| 3,221,204 | 11/1965 | Hant et al. | 315—39.3 X |
| 3,233,139 | 2/1966 | Chodorow | 315—3.5 |
| 3,365,607 | 1/1968 | Ruetz et al. | 315—3.5 |

HERMAN KARL SAALBACH, Primary Examiner

SAXFIELD CHATMON, Jr., Assistant Examiner

U.S. Cl. X.R.

313—37; 315—3.5; 333—33